Feb. 11, 1941.  G. M. OLSEN  2,231,192
WHEEL JACK
Filed Sept. 5, 1939
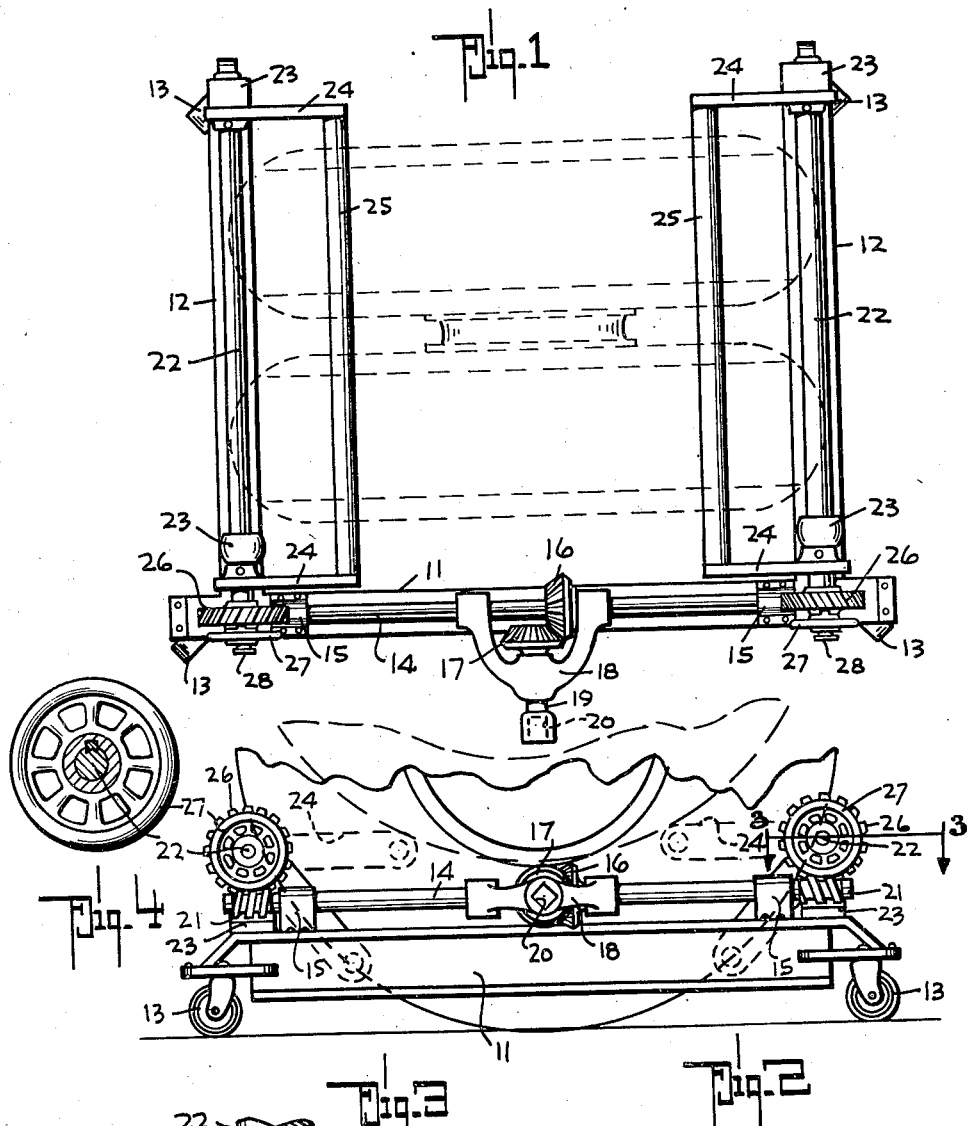
GEORGE M. OLSEN
Inventor
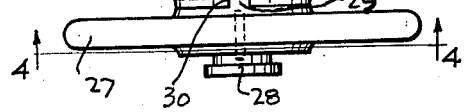
Attorney Patented Feb. 11, 1941

2,231,192

UNITED STATES PATENT OFFICE 2,231,192

WHEEL JACK

George M. Olsen, Opportunity, Wash.

Application September 5, 1939, Serial No. 293,329

2 Claims. (Cl. 254—2)

My present invention relates to improvements in wheel jacks, and while the improvements may be embodied in various types of jacks for the same specific purpose, I prefer to utilize them in connection with the servicing, removal and replacement of wheels of the dual type as used on automotive vehicles, especially on trucks, buses and other heavy duty transportation equipment.

As is well known, present day vehicles of the heavy duty type are equipped with dual wheels in which two wheels are mounted side by side and to each is fitted the usual tire, making a unitary assembly that is too heavy for one man to lift and difficult for two or more to properly manipulate during the servicing of these types of vehicles. To overcome the present difficulties I provide a wheel jack that may be inserted under a pair of dual wheels to lift these wheels for placement upon a vehicle or to so locate the jack that when the wheels are raised free from the ground and are to be removed from an axle of the vehicle the jack may be inserted, raised to engagement with the wheels, and when the securing means have been removed will permit the jack to wholly support the wheels, transport them to a position out of the way for subsequent work upon the axle, and which as readily can present the wheels to the axle for final assembly.

It is therefore an object of my invention to provide a jack readily adaptable for use by a lone individual who may handle heavy single wheels or wheels of the dual type that are ordinarily too heavy to handle, and which with facility provides for ready removal, support and replacement of such wheels.

In the accompanying drawing I have illustrated one example of the physical embodiment of my invention wherein the jack is constructed for the performance of the objects set forth in a ready and simplified manner, but it will be understood that changes and alterations may be made in this exemplified structure, within the scope of my claims, without departing from the principles of my invention.

Figure 1 is a plan view of the improved wheel jack.

Figure 2 is an end elevation thereof.

Figure 3 is an enlarged detail of the clutch means for fixing the gear wheel to the operating shafts to effect a lifting action upon dual tire assemblies, in which the gear wheel is shown in cross section and in part in plan.

Figure 4 is a cross section taken on line 4—4 of Figure 3.

In Figure 1, where I have illustrated one way of using the jack preparatory to operation thereof, I have indicated in dotted lines a dual wheel assembly which this jack is capable of lifting, transporting and effecting an adjustment to conform to the elevation of an axle so that the dual assembly may be mounted on said axle conveniently and without the requirement of extra help.

The jack comprises a frame 10 of substantially U shaped formation in which the base 11 of the frame supports the two leg members 12 standing at substantially right angles to the ends of the base 11. Upon the four corners of this frame are mounted caster wheels as 13 that support the frame above the floor and provide for movement of the frame about a shop, garage or factory. Upon the base structure 11 is mounted a cross shaft 14 supported in bearings 15 for rotation therein, and this shaft is provided with means for rotation which comprises the use of the bevel gear 16 fixed to the shaft 14 and a bevel gear 17 in engagement therewith and supported by a yoke 18. The gear 17 mounted upon the shaft 19 is rotatable in the yoke 18, and the free end of the shaft is provided with a socket as 20 to receive a wrench that may be applied thereto for the purpose of turning the shaft, and in turn rotating the cross shaft 14.

The outer ends of the shaft 14 are provided with worm gears 21 fixed to the shaft and rotatable therewith for the purpose of driving the lifting elements of the jack. These elements comprise a shaft 22 rotatably mounted in suitable bearings 23 that are fixed to and supported by the leg elements 12 of the frame; there being two of these shafts in parallel relation, each mounted substantially above the leg elements. Each of these shafts 22 carries a pair of spaced arms 24 and supporting upon their outer ends a roller or shaft member 25. The arms 24 are disposed inwardly of the frame, and the rollers 25, which are parallel to each other, are capable of being raised or lowered by pivotal movement of the arms 24 and through the rotation of the shaft 22.

Due to the formation of the frame structure, in which one end is open, the lifting elements may be inserted under a dual tire assembly, and through action causing turning movement of the shaft 19 the lifting elements will raise and bear against the tires of the wheel assembly and elevate them to the desired degree. It will be understood, however, that this jack is not intended for the lifting of a truck or such vehicle but is intended to engage the wheel assembly for removal or replacement, or for support during the time of removal from the vehicle.

For rotating the shafts 22 a worm wheel 26 is mounted on one end of the shaft to engage with the worm wheel 21 so that upon rotation of the shaft 14 the shafts 22 may be properly rotated. This wheel 26 is free on the shaft but may be fixed thereto by the clutch element 27 which is splined to the shafts 22 as at 28, whereby the clutch is mounted for sliding action and has on one face of its hub a set of jaws 29 engaging in complementary sockets 30 to fix the worm gear to the shaft during the operation period of lifting or holding a tire assembly. By retracting the clutch, or both clutches, the lifting arms 24, with their supported rollers 25, are free to drop clear of contact with the tires and permit the jack to be withdrawn.

It is to be understood that through the arrangement that I have here illustrated this jack is primarily intended for use when repairing, greasing or performing other services upon an automotive vehicle, especially one carrying dual wheels, where it is necessary to remove the wheels for the various services required or for brake adjustment and such other requirements as may be necessary. It is usual, therefore, to lift the axle upon the side to be worked upon, remove the necessary bolts and other securing means, then to place my jack in position under the wheels until the wheels are lifted free and can be easily and readily removed from the axle. The casters permit withdrawal of the jack supporting the wheels.

When the wheels are to be remounted to the truck my jack will, with equal facility, pick them up, elevate them to coincide with the axle, and permit the wheels to be presented properly to said axle, to the end that considerable labor and time are saved on the part of mechanics working upon the truck.

Having thus fully described my invention, what I claim as new and desire to secure by Letters Patent is:

1. A dolly comprising a U-frame having a base and a pair of legs extending therefrom at the ends, a cross-shaft supported for rotation on the base of the U-frame and having an intermediate bevel gear, a yoke swingingly mounted on said shaft and supporting a stub shaft having a bevel gear in mesh with the bevel gear on the cross shaft and having an outboard socket, a rock shaft journaled on each leg of said U-frame and having a lifting arm near each end, a roller shaft and roller thereon between the outer ends of each pair of lifting arms, and a gear couple between each end of the cross shaft and an end of the adjacent rock shaft.

2. A dolly comprising a U-frame having a base and a pair of legs extending therefrom at the ends, a cross-shaft supported for rotation on the base of the U-frame and having an intermediate bevel gear, a yoke swingingly mounted on said shaft and supporting a stub shaft having a bevel gear in mesh with the bevel gear on the cross shaft and having an outboard socket, a rock shaft journaled on each leg of said U-frame and having a lifting arm near each end, a roller shaft and roller thereon between the outer ends of each pair of lifting arms, a gear couple between each end of the cross shaft and an end of the adjacent rock shaft, said gear couple comprising a gear secured on each end of the cross shaft, a second gear element rotatably mounted on each rock shaft and having clutch means on its face; and a clutch wheel slidably keyed to each rock shaft and having means engageable with the clutch means on the adjacent gear.

GEORGE M. OLSEN.